(No Model.)

F. FEAR.
ELECTRO MAGNETIC ATTACHMENT FOR EYEGLASSES.

No. 397,790. Patented Feb. 12, 1889.

Witnesses,
Wm A Courtland,
Morris Fleischmann.

Inventor,
Frederick Fear

UNITED STATES PATENT OFFICE.

FREDERICK FEAR, OF NEW YORK, N. Y.

ELECTRO-MAGNETIC ATTACHMENT FOR EYEGLASSES.

SPECIFICATION forming part of Letters Patent No. 397,790, dated February 12, 1889.

Application filed May 1, 1888. Serial No. 272,527. (No model.)

*To all whom it may concern:*

Be it known that I, FREDERICK FEAR, a subject of the Queen of Great Britain, and a resident of New York city, in the county of New York and State of New York, have invented certain new and useful Improvements in Electro-Magnetic Attachments for Eyeglasses and Spectacles, of which the following is a specification.

My invention relates to improvements in electro-magnetic attachments for eyeglasses and spectacles, of which a full and clear description will be given hereinafter.

My invention consists of a nose-guard composed of springy metal, preferably magnetic, wound with an insulated electrical conductor, having the ends electrically connected with the aforesaid nose-guard. One end of each of the pieces forming the said nose-guard is mounted with a metallic plate, one being electro-positive to the other. The remaining ends of said pieces forming the nose-guard are held to the metallic frame by screws, rivets, soldered, or the same may be welded thereto.

Figure 1:
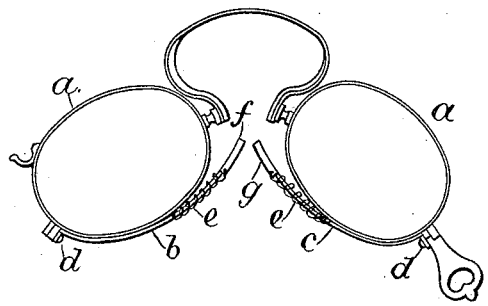
Figures 2, 3:
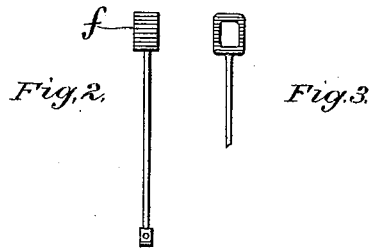
Figure 4:
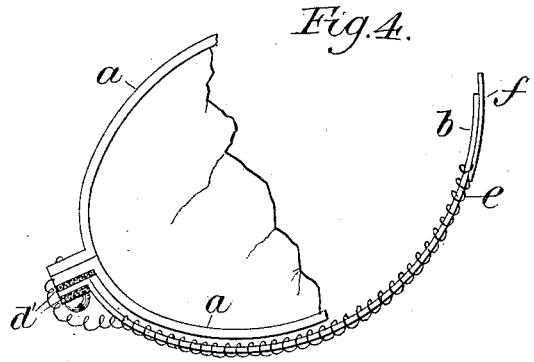

In the drawings, Figure 1 represents a front elevation, in which is shown the main feature of my invention. Fig. 2 represents a detached view of one of the springs forming one side of the nose-guard. Fig. 3 is a modified form thereof. Fig. 4 represents a detail of one side of the eyeglass, showing the manner in which the electrical attachments are connected therewith.

Similar letters refer to similar parts throughout the drawings, in which—

$a$ represents the metallic frame; $b\ c$, the springs forming the nose-guard, held thereto by means of screws $d$ and insulated from the frame by means of the insulating-washers $d'$. Each of these springs is wound with the insulated electrical conductor $e$, each having one of its ends electrically connected to said springs $b\ c$, the remaining ends electrically connected with their respective metallic plates $f\ g$, one being electro-positive to the other.

In lieu of the plates $f\ g$, I may have the ends of the same in the form of loops. It will be obvious that this electrical attachment may be applied to any eyeglasses or spectacles having metallic frames without in any way altering them.

It will also be obvious that when the plates $f\ g$ come in contact with the acidulated moisture of the nose it will cause a molecular disturbance in the metal, thus causing a current of electricity to flow through the electrical conductors—thus magnetizing the entire frame.

I am aware that the bridge-pieces of spectacles and eyeglasses have heretofore been wound with insulated electrical conductors connected with metallic plates mounted on the usual nose-piece thereof; but I am not aware that an electrical nose-guard or appliance of the construction shown in my invention was ever before known.

Having thus shown and described my invention, what I claim as new, and desire to secure by Letters Patent, is—

The combination, with the metallic frame of eyeglasses or spectacles, of the springy metallic nose-guards having their lower ends secured to and insulated from the frame and their upper ends free therefrom, each spring of said nose-guards having an insulated electrical conductor wound thereon and electrically connected therewith, and the metallic plates, one electro-positive to the other and electrically connected to their respective nose-guards, substantially as shown and described.

Signed at New York city, in the county of New York and State of New York, this 21st day of February, A. D. 1888.

FREDERICK FEAR.

Witnesses:
MORRIS FLEISCHMANN,
JACOB FLEISCHMANN.